United States Patent Office 3,036,960
Patented May 29, 1962

3,036,960
METHOD OF ISOLATING AND PURIFYING A PROTEASE FROM ASPERGILLUS
Pierre Lallouette, Jouy-en-Josas, France, assignor to Societe a Responsabilite Limitee dite: Societe d'Etudes et d'Applications Biochimiques (S.E.A.B.), Jouy-en-Josas, France
No Drawing. Filed July 14, 1958, Ser. No. 748,166
Claims priority, application France July 19, 1957
12 Claims. (Cl. 195—66)

Laboratory processes are well known which employ ion-exchange resins to separate such substances as proteins, enzymes, peptides or amino-acids.

These methods of separation present considerable advantages over other methods currently used, since they permit the manipulation of organic solvents or salts to be avoided, as well as low temperature fractionations which generally require a particularly delicate material, but nevertheless usually provide only very low yields.

Many attempts have been made to utilize such ion-exchangers to obtain enzymes from tissues, or even from certain biological liquids.

However, all of these laboratory experiments have ordinarily been carried out on products already partially purified by other methods and on very small quantities of test material, by reason of the difficulties involved in the utilization of relatively large quantities of resins in proportion to the product to be purified, and those due to the extreme slowness with which these liquids flow through the resins, which render it practically impossible to treat a large volume of liquid.

The method of extracting protease from *Aspergillus oryzae* presents the following characteristic steps:

I. *First step.*—The employment of a weakly acid cation exchange carboxylic resin (IRC 50) to directly extract the enzyme from the culture broth under conditions which avoid the difficulties hereinbefore set forth.

(a) The use of a relatively heavy resin to avoid clogging (30 to 50 mesh).
(b) A sufficiently rapid flow to permit the passage of a substantial volume of broth within a reasonable time, while nevertheless providing a quantitative adsorption (speed of 2 ml./cm.$^2$/min.).
(c) The use of a relatively small quantity of resin so that it becomes nearly saturated with the enzyme (from 2 to 5 kg. of resin per 100 liters of broth, depending on the broth).
(d) Before adsorption, the resin is buffered to pH 4.5 by prolonged washing with dilute ammonium acetate, pH 4.5 M/50.

II. *Second step.*—The enzyme retained by the resin is thoroughly washed with a very dilute buffer (ammonium acetate, sodium acetate, or sodium citrate, pH 4.5, concentration M/50.)

The use of these dilute buffers permits the washing to be prolonged without loss or desorption, even though pure water would cause substantial losses.

This prolonged washing permits the elimination of many impurities.

III. *Third step.*—An ammonium acetate buffer (pH 5.5, concentration M) is used for the elution for the following reasons:

(a) Elution with this buffer is truly selective and has the characteristic features of true chromatography, even with a resin which is almost saturated with the enzyme. The latter emerges almost completely purified, whereas with phosphates, for example, many other substances adsorbed by the column are secured at the same time.

(b) The ammonium acetate, even at a higher concentration, is not precipitable by the two volumes of acetone, which permits:

IV. *Fourth step.*—Elimination of the buffer by acetonic precipitation of the enzyme, avoiding use of dialysis:

The active fractions are brought together, neutralized at pH 7 by a little ammonia, cooled to 0° C.

The precipitated enzyme is centrifuged at a temperature of about 0° C. The acetone remaining in the precipitate is quickly eliminated by subjecting the precipitate to the vacuum of a water-jet pump.

V. *Fifth step.*—The precipitated enzyme, diluted in a little water, is subjected to chromatographic purification on a second column of resin (IRC 50) which is much finer (XE 64, for example). Only about 1/10 as much resin is used, since because the proteins are adsorbed at the surface of the grains of resin, the finer the grains of resin, the greater their total surface and the greater the capacity of a given weight of resin to absorb the enzyme.

The buffer used in this elution is the same as in the third step but is diluted by an equal volume of water (buffer-ammonium acetate, pH 5.5, concentration 0.5 M). The combined active fractions are neutralized either with ammonia, or preferably by passage through resin IR 4B.

The buffer is eliminated, as before, by acetonic precipitation (1.2 volumes of acetone will usually suffice), followed by low temperature centrifuging, as before, the acetone being removed from the precipitate by subjecting the latter to several minutes of vacuum treatment.

VI. *Sixth step.*—The enzyme which has been purified in the foregoing manner may be preserved for several months by redissolving the precipitate in a little water and keeping it frozen. However, even though the buffer and the acetone have been almost completely eliminated, very small traces of these substances may remain and may present disadvantages when, for example, the product is to be used for medical purposes. These last traces completely disappear if the enzyme is lyophilized. Moreover, this constitutes a convenient method of preserving the enzyme indefinitely, even at ordinary temperatures and without special precautions.

In addition to these essential operations: adsorption by IRC 50, abundant washing with a diluted buffer, elution by ammonium acetate, first acetonic precipitation, chromatographic precipitation on fine IRC 50, second acetonic precipitation, and lyophilization, if the culture broth is rich in calcium salt, it may be necessary to eliminate the calcium ions which may be found in the first eluates. This is easily accomplished by passing the liquid obtained by dissolving the first acetonic precipitate through a small column of IRC 50 which has been saturated with soda or ammonia and brought to pH 7 by washing with water. The calcium ions remain in the column and are exchanged for Na or NH$_4$ ions.

*Example.*—Extraction of protease from *Aspergillus* cultures:

The culture broth is first filtered, then acidified with acetic acid to a pH slightly less than 5, at which pH the protease is still stable when diluted as intended, and in view of the other constituents of the culture broth.

This acidified culture broth, which also contains an amylase and other enzymes, is then passed through a column of weakly acidic cation exchange material, for example a resin of the type commercially known as "Amberlite IRC 50" put out by Rohm and Haas.

If this resin is used at its commercial fineness (about 30–50 mesh), two kilograms of resin should be used for each 50 to 100 litres of broth, depending on the richness of the broth.

If the same resin is used after being ground to a fineness of 70 to 80 mesh, the overly fine particles having been separated by decanting, only one kilogram of resin is required for the same quantity of broth.

In order to determine the proper amount of resin, that is to say the amount which will be nearly saturated by a given volume of broth, a preliminary test should be carried out on a small quantity.

With respect to the buffer it should be noted that the same volume of a given buffer is required to saturate a given weight of resin, regardless of its fineness. If the buffer used for the elution is the same, the concentration of the enzyme in the eluate will thus be greater with the resin ground to 70–80 mesh, than with the resin in its commercial form.

Regardless of whether the resin used is new or has been previously used, it should be subjected to the following complete regenerating cycle:

(1) Treatment with sodium hydroxide 1 N to saturation.
(2) Washing with water.
(3) Regeneration with hydrochloric acid 1 N.
(4) Washing with water.
(5) Washing with a diluted buffer such as ammonium acetate M/50 to a pH of 4.5.

The washings always require a large volume of water. Ordinary water may be employed before the treatment with hydrochloric acid, since the hydrochloric acid will eliminate the calcium salts which would have been adsorbed or would be precipitated. The formation of bubbles of carbonic gas must always be avoided.

Before adsorption, the resin in the column will be thoroughly washed with a buffer consisting of diluted ammonium acetate M/50 having a pH between 4.5 and 4.7, which corresponds approximately to the concentration of ions in the culture broth to be treated.

The adsorption is carried out at a rate of flow of 2 to 4 ml./min. per square centimeter of cross-section of the column, which corresponds to a flow of 6 to 10 liters per hour for a column having a diameter of 8 centimeters. Under these conditions all of the amylasic activity takes place in the effluent and in the washing water.

The washing is effectuated with a volume of water equal to about half that of the culture broth and may be prolonged without inconvenience, the rate of flow being greater than that used for adsorption. The buffering agent used may be the same as before the adsorption (pH equal to 4.5), or sodium acetate or sodium citrate, at the same pH and concentration.

The elution is then carried out by passing ammonium acetate 1 N at a pH of 5.5 through the column. The speed is of the order of ½ to 1 ml./cm.$^2$/min.

The eluates which come out at a pH of about 5, are susceptible of rapidly losing their activity at the end of several hours. They are consequently neutralized without further delay and even before the end of the elution if that takes too long. This neutralization may be accomplished either by passage through weakly basic anion exchange resins, for example, resins of the type commercially known as IR 4B and sold by Rohm and Haas, so as to remove the excess acid, or by carefully adding dilute ammonia, concentration 1 N or 2 N.

At a pH of 7 the enzyme may be kept for several days in a refrigerator without any loss.

The neutralized eluate is then cooled to about 0° C. Acetone cooled to −10° C. is then poured over it, while it is being constantly stirred.

The quantity of acetone required for the precipitation may vary between 1.2 and 2 volumes, but is usually about 1.5 volumes. It is desirable to avoid heating during the precipitation and to cool the mixture as much as possible. It is also best to centrifuge at the lowest possible temperature.

In order to thereafter eliminate the greater part of the acetone contained in the precipitate, the latter is subjected to vacuum pumping at the laboratory temperature for ¼ of an hour. The precipitate then goes back into solution in the water which it contains.

This solution often contains calcium adsorbed on the column and eluted by the acid of the buffer. In order to decalcify the solution, it is diluted in several volumes of water and passed through a small column of resin, of the same type as before (IRC 50), but saturated with sodium or ammonia and washed with water to a pH equal to 7. The enzyme passes through the column while the Na ions are exchanged with the calcium. The column is then washed with two or three volumes of water to recover all of the enzyme.

The effluent and the wash waters are diluted with deionized water to a volume substantially equal to that of the first eluate, which may be from one-tenth to one-fifteenth that of the original broth. This liquid should not be very acid and its pH should be about 7, as is necessary for the enzyme to keep well, without damage by adsorption, in view of the very low concentration of ions.

For the second adsorption, a fine resin is employed, such as that commercially known as XE 64 and sold by Rohm and Haas (IRC 50 fine), about one-tenth as much as was used for the first adsorption, if it was used in its commercial form, or about one-fifth as much if it was used in the first adsorption only after having been ground to 70 mesh. Of course, the very fine particles of resin which may remain in suspension after ten minutes in from 15 to 20 centimeters of water, are first eliminated. The capacity of this fine resin for the enzyme is about 20 times greater for an equal weight than that of the larger grained resin used for the first adsorption.

In order to obtain a satisfactory result only the upper part of the resin should be permitted to become saturated, leaving the lower part free for chromatographic purification.

The liquid containing the enzyme should be passed through the resin at the rate of about 1 ml./cm.$^2$/min.

It is then washed, as for the first adsorption, with the same buffer concentration M/50, pH 4.5, using a volume of buffer approximately equal to that of the liquid adsorbed.

One then elutes with ammonium acetate 0.5 M as a buffer at a pH of 5.5, the rate of flow being about 0.5 ml./cm.$^2$/min.

The active fractions are then neutralized, as after the first adsorption, by passage through the weakly basic anion-exchange resin, which may be of the type commercially known as IR 4B and marketed by Rohm and Haas.

The enzyme may be kept cool in a refrigerator for several months without deteriorating.

The ammonium acetate contained in these neutralized eluates is eliminated by a second precipitation by adding 1.2 to 1.5 volumes of acetone. The acetone is eliminated from the precipitate by vacuum means. The last traces of acetone and ammonium acetate are eliminated by lyophilization.

It should be noted that the process which has just been described does not require large quantities of acetone and permits the same resin to be used and re-used almost indefinitely.

The adsorption and washing may be carried out without any surveillance and the elution may easily be made automatic, if desired.

The first adsorption gives a yield in enzymatic activity approximating 100%.

The final yield of pure enzyme is of the order of 80%.

From the first elution, the enzyme obtained contains no more than traces of other enzymes.

Moreover, the enzyme obtained is but slightly colored and is practically free from mineral salts.

What is claimed is:

1. A method of isolating and purifying a protease from a culture broth of *Aspergillus oryzae* comprising the steps of successively acidifying the culture broth, passing it through a first column of reticulated carboxylic weakly acid cation-exchange resin, eluting with a weak buffer of ammonium acetate at a one molar concentration and a pH of 5.5, precipitating the eluate with acetone to eliminate the buffer, redissolving the precipitate in water, and subjecting it to chromatography on a second column of weakly acid cation-exchange resin substantially finer than that first employed, which is of a common, not very fine commercial type, again eluting with a weak buffer of ammonium acetate at a 0.5 molar concentration and a pH of 5.5, and eliminating said non-precipitable buffer by acetone precipitation of the protease, centrifuging the protease precipitate at a low temperature, subjecting the precipitate to vacuum drying followed by an operation of lyophilisation to eliminate the last traces of said buffer and acetone.

2. A method as claimed in claim 1 in which the culture broth is acidified with acetic acid to a pH slightly less than 5; in which ammonium acetate at a concentration of M/50 and a pH of 4.5 is used for washing both before and after adsorption on the first column; in which said washing before adsorption is maintained during a sufficient time for buffering the resin at pH 4.5; and in which said washing after adsorption is also maintained during an extended period of time, without any loss or desorption, owing to the nature of said diluted buffer.

3. A method as claimed in claim 1 in which the resin in the first column is a weakly acid cation exchange carboxylic resin having a reticulate structure.

4. A method as claimed in claim 1 in which the resin in the first column has a fineness between 30 and 50 mesh, and is employed in the ratio of 2 kg. of resin per 50 to 100 liters of culture broth.

5. Method according to claim 1 in which the resin to be used in the first column is first reduced to a fineness of between 70 and 80 mesh and decanted to remove excessively fine particles, said resin being employed in the ratio of one kg. of resin per 50 to 100 liters of culture broth.

6. Method according to claim 1 in which those excessively fine particles which will remain in suspension in between 15 and 20 centimeters of water for ten minutes are eliminated from the resin used for chromatography before the dissolved precipitate is passed therethrough.

7. Method according to claim 1 in which almost all of the resin in the first column becomes saturated as the culture broth passes therethrough.

8. Method according to claim 1 in which only the upper part of the column of fine resin is saturated, thus leaving the lower portion of this column available for chromatography.

9. Method according to claim 1 in which the first acetonic precipitate is cleansed of any calcium which has been eluted by the acid of the buffer by diluting said precipitate and passing it through a column of weakly acid cation exchange resins saturated with soda, and then washing it with water until its pH approximates 7, and in which all of the protease is recovered by rinsing the column with two or three volumes of water.

10. Method as claimed in claim 1 in which the eluate from the first column is neutralized by means of ammonia diluted to a concentration between 1 N and 2 N.

11. Method as claimed in claim 1 in which the eluate from the first column is neutralized by passage through a weakly basic anion-exchange resin.

12. Method as claimed in claim 1 in which the eluate from the second column is neutralized by passage through a weakly basic anion-exchange resin.

References Cited in the file of this patent

UNITED STATES PATENTS 2,848,371    Yoshida _____ Aug. 19, 1958

OTHER REFERENCES

"Nature," vol. 166 (1950), page 1077.

"Advances in Enzymology," vol. 14 (1953), Interscience Pub. Inc., New York, pages 338–344.

Proc. of the Int. Symposium on Enzyme Chemistry, Tokyo and Kyoto, 1957, published 1958, Marzuen, Tokyo, pp. 504 to 509. QP 601 I 5.